(12) United States Patent
Kelleher

(10) Patent No.: US 7,412,231 B1
(45) Date of Patent: Aug. 12, 2008

(54) METHOD AND APPARATUS FOR CELLULAR INSTANT MESSAGING

(75) Inventor: David Wayne Kelleher, Walnut Creek, CA (US)

(73) Assignee: Cellco Partnership, Bedminster, NJ (US)

( * ) Notice: Subject to any disclaimer, the term of this patent is extended or adjusted under 35 U.S.C. 154(b) by 165 days.

(21) Appl. No.: 09/689,245

(22) Filed: Oct. 11, 2000

Related U.S. Application Data

(60) Provisional application No. 60/160,116, filed on Oct. 18, 1999.

(51) Int. Cl.
*H04Q 7/22* (2006.01)

(52) U.S. Cl. .................. 455/412.1; 455/432.1; 709/207

(58) Field of Classification Search .................. 455/435, 455/432, 421, 412.1, 414.3, 412.2, 4.16, 455/416, 435.1, 463, 432.1, 465, 414.1, 420, 455/419, 421.1, 414.2, 466; 709/206, 207, 709/208

See application file for complete search history.

(56) References Cited

U.S. PATENT DOCUMENTS

| | | | | |
|---|---|---|---|---|
| 4,065,642 | A | | 12/1977 | McClure |
| 5,216,703 | A | | 6/1993 | Roy |
| 5,978,678 | A | * | 11/1999 | Houde et al. ................ 455/433 |
| 6,208,872 | B1 | * | 3/2001 | Schmidt ..................... 455/518 |
| 6,295,291 | B1 | * | 9/2001 | Larkins ...................... 370/352 |
| 6,301,609 | B1 | * | 10/2001 | Aravamudan et al. ....... 709/207 |
| 6,366,962 | B1 | * | 4/2002 | Teibel ........................ 709/245 |
| 6,421,354 | B1 | * | 7/2002 | Godlewski .................. 370/466 |
| 6,430,604 | B1 | * | 8/2002 | Ogle et al. .................. 709/207 |
| 6,512,930 | B2 | * | 1/2003 | Sandegren .................. 455/518 |
| 6,539,421 | B1 | * | 3/2003 | Appelman et al. .......... 709/206 |
| 6,557,029 | B2 | * | 4/2003 | Szymansky ................. 709/206 |
| 6,587,691 | B1 | * | 7/2003 | Granstam et al. ........... 455/457 |
| 6,744,759 | B1 | * | 6/2004 | Sidhu et al. ................. 370/356 |
| 6,750,881 | B1 | * | 6/2004 | Appelman ................... 715/733 |
| 6,807,567 | B2 | * | 10/2004 | Nogami et al. .............. 709/214 |
| 6,857,072 | B1 | * | 2/2005 | Schuster et al. ............. 713/160 |
| 2002/0173306 | A1 | * | 11/2002 | Adamany et al. ........... 455/432 |
| 2002/0177438 | A1 | * | 11/2002 | Sakai et al. ................. 455/432 |
| 2004/0186909 | A1 | * | 9/2004 | Greenwood ................. 709/227 |

OTHER PUBLICATIONS

Gerry Christensen, "Mobile Basics", 2000, www.mobileIN.com, 3 pgs.
Comverse Network Systems, "ISMSC", 2000, www.netology-sms.com, 2 pgs.
TechEncyclopedia, "WAP", 2000, www.techweb.com, 5 pgs.
Cellemetry, Technical Overview, 2000, www.cellemetry.com, 1 pg.

(Continued)

*Primary Examiner*—George Eng
*Assistant Examiner*—Khawar Iqbal
(74) *Attorney, Agent, or Firm*—Gates & Cooper LLP

(57) ABSTRACT

The key to enabling cellular instant messaging is to identify that the cellular customer has turned their phone on or has turned their phone off in order to add/delete their name from the instant message buddy/friend list. To accomplish this without readily accessible network triggers or prior to deploying cellular packet data service is a challenge. To meet this challenge the present invention utilizes telemetry messages that indicate when a cellular phone is available on a cellular network. Thereafter, relevant cellular phones on a buddy list stored in an instant messaging database are notified of a cellular phone's availability.

42 Claims, 2 Drawing Sheets

OTHER PUBLICATIONS

Cellemetry, System Description, 2000, www.cellemetry.com, 3 pgs.
TechEncyclopedia, "IS-41", 2000, www.techweb.com, 1 pg.
TechEncyclopedia, "Telemetry", 2000, www.techweb.com, 1 pg.
TechEncyclopedia, "SS7", 2000, www.techweb.com, 5 pgs.
WAP-195-WAEOverview, Version 1.3, 1998, 1999, 2000, 23 pgs.
The Wireless Application Protocol, 1999, 21 pgs.
TechEncyclopedia, "SMTP", 2000, www.techweb.com, 2 pgs.
Phone.com UP.Link Server 4.3, 2000, 2 pgs.
Infinite WAP Server: How it Works, 2000, www.waplite.com, 3 pgs.
Phone.com—UP.Link Server Suite, 2000, www.phone.com, 3 pgs.
Web-to-Wireless Technology, "Microburst Overview", 2000, www.aeris.net, 2 pgs.
Web-to-Wireless Technology, "The Aeris Network", 2000, www.aeris.net, 2 pgs.
Web-to-Wireless Technology, "Microburst Remote Feature Access", 2000, www.aeris.net, 2 pgs.

\* cited by examiner

METHOD AND APPARATUS FOR CELLULAR INSTANT MESSAGING

CROSS-REFERENCE TO RELATED APPLICATIONS

This application claims the benefit under 35 U.S.C. Section 119(e) of the following co-pending and commonly-assigned U.S. provisional patent application which is incorporated by reference herein:

Provisional Application Ser. No. 60/160,116, filed Oct. 18, 1999, by David W. Kelleher, entitled "METHOD AND APPARATUS FOR CELLULAR INSTANT MESSAGING,".

BACKGROUND OF THE INVENTION

1. Field of the Invention

The present invention relates generally to a cellular phone system, and in particular, a method and apparatus for cellular instant messaging.

2. Description of the Related Art

Instant messaging is a popular application in use today on the Internet. In instant messaging, a program informs users when any individuals in their list of "buddies" (colleagues, workgroup members, friends, etc.) log onto the network so they can chat. Instant messaging software also notifies a user if a "buddy" sends them a message. A "chat" is the capability to conference with one or more users on a local network (LAN), on the Internet or via a BBS (bulletin board system). The chat is accomplished by typing on the keyboard, not speaking, and each keystroke may be transmitted as it is pressed. Instant messaging service requires that an instant messenger application be resident on a user's computer and the user must have Internet access through an Internet service provider.

The instant messaging application serves two purposes, first it provides a mechanism for the user to be notified when friends (or "buddies") the user has pre-designated have logged onto the Internet. Second, the application serves as a communications tool whereby users on the list can send and receive text messages.

America Online (AOL) is the main provider of Instant messaging on the Internet and has enjoyed a very successful product. The popularity of instant messaging has begun to bring competitors to the market. For example, Yahoo and Microsoft (MSN) now offer a similar service.

Extending instant messaging to a wireless environment is a valuable service. The prior art does not provide the ability to inform a user when another "buddy" on a cellular phone has turned on his/her cellular phone, when another "buddy" has logged onto a computer network.

SUMMARY OF THE INVENTION

To overcome the limitations in the prior art described above, and to overcome other limitations that will become apparent upon reading and understanding the present specification, the present invention discloses a method that involves the melding of cellular systems, pre-WAP (wireless application protocol) gateway architecture, telemetry services, handset functionality, and Internet messaging protocols to deliver cellular instant messaging.

The present invention provides a method and apparatus for cellular instant messaging. The present invention incorporates cellular telemetry into a digital cellular phone and utilizes the cellular telemetry to detect when a cellular customer has logged onto the cellular network or logged off of the cellular network. Upon logging onto the network or leaving the network, a telemetry message is generated and the present invention utilizes this telemetry message to update an instant messaging database and to refresh buddy/friends lists on PCs connected to the Internet and on cellular phones. The present invention uses voice, data, and SMS services to allow customers to exchange messages with their pre-designated community of friends, or to place a telephone call to a friend within their pre-designated community.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Figure 1:
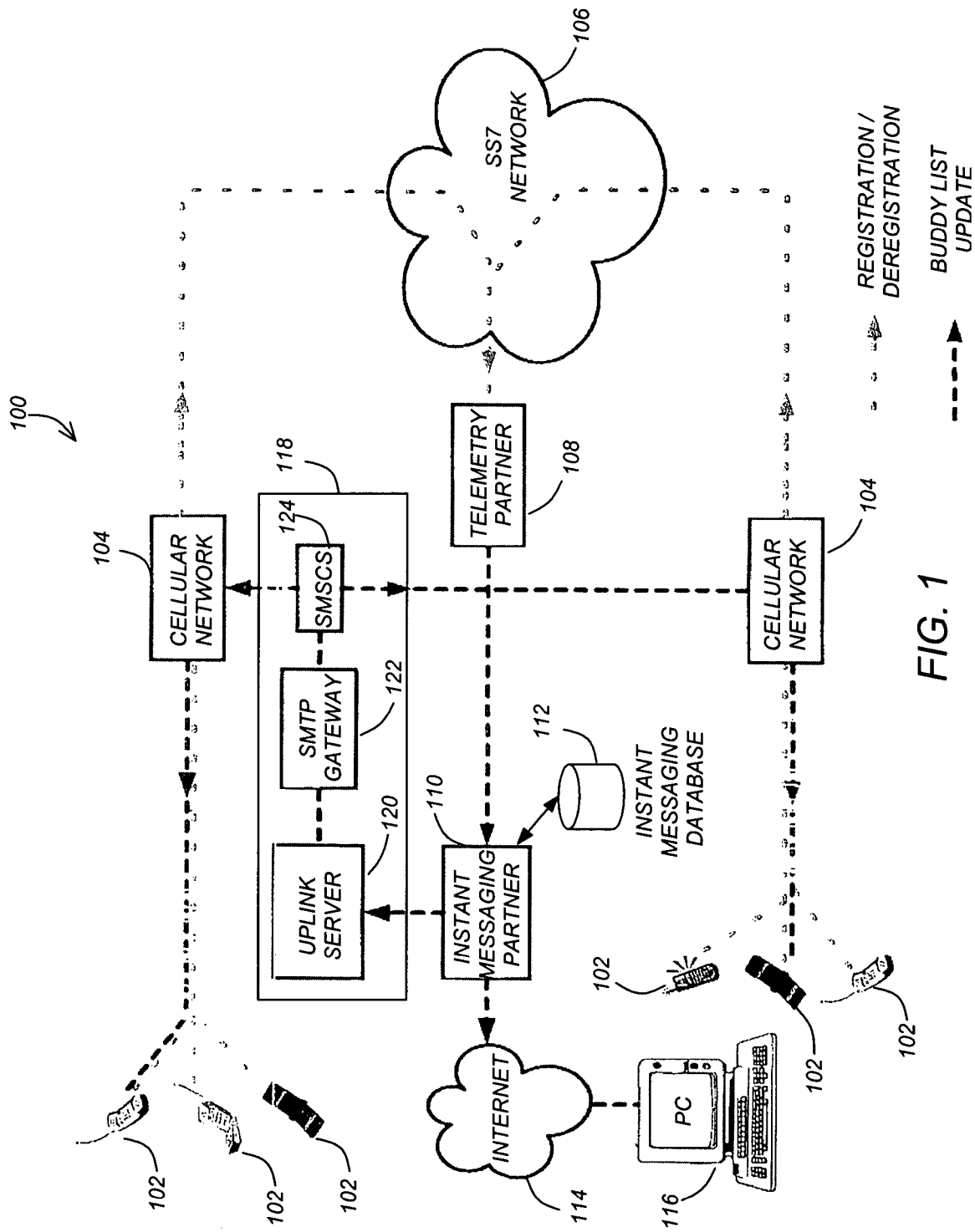
FIG. 1 illustrates a phone system 100 in accordance with one or more embodiments of the invention.

FIG. 1 illustrates a phone system 100 in accordance with one or more embodiments of the invention. Within a cellular phone system 100, a service area is divided into cells, each of which has the necessary equipment to switch, transmit, and receive calls to/from any cellular phone 102 located in the cell. A transceiver in each cell can transmit and receive a plurality of FM channels in a specified frequency range simultaneously.

A cellular phone 102 consists of a control unit, a transceiver, and appropriate antennas. The transceiver contains circuits that can tune to any of the channels assigned to the cellular phone system 100. Each cellular phone 102 has a unique electronic serial number (ESN). Additionally, each cellular phone 102 is assigned a 10-digit mobile identification number (MIN) identical in form to any other telephone number.

Users of the cellular phone 102 dial the local or long-distance number where applicable, as if calling from a fixed telephone. The cellular customer is typically charged a monthly connect charge as well as air-time usage charges for either incoming or outgoing calls.

The cellular phones 102 are interconnected and controlled by a central Mobile Telecommunications Switching Office (MTSO) across a signaling system 7 (SS7) network 106. The MTSO is basically a telephone switching office as far as hardware is concerned, but includes a substantial amount of additional digital equipment programmed for cellular control. The MTSO not only connects the system 100 to the land telephone network (the SS7 network 106), but also records call information for billing purposes. SS7 is the protocol used in the public switched telephone system for setting up calls and providing services. SS7 sets up and tears down the call, handles all of the routing decisions, and supports all modern telephony services such as 800 numbers, call forwarding, caller ID, and local number portability (LNP).

A cellular network 104 provides cellular service in a particular region or area and may include one or more MTSOs to provide the cellular service. A cellular phone 102 is associated with a particular cellular network 104 as a home location/area. When a cellular phone 102 is taken outside of the home location or into another cellular network 104 area, the cellular phone 102 is "roaming". The interim standard-41 (IS-41) is the protocol for passing cellular subscriber information from one carrier/cellular network 104 to another to provide roaming capabilities. Accordingly, IS-41 allows mobile travelers to roam across the country.

A message must be sent from a cellular phone 102 to the phone's 102 serving home location register before service is allowed when roaming. Such a message registers the phone in the foreign cellular network 104. When the cellular phone 102 is taken into a foreign cellular network 104, a message is transmitted to an MTSO in the foreign network 104. The foreign network 104 recognizes that the cellular phone 102 is from a different network and requests validation of the phone's 102 service from the phone's 102 home cellular network 104. Once validated, the cellular phone 102 is permitted to make and receive calls while in the foreign network 102.

Various methods of transmitting and various types of telemetry messages may leverage the IS-41 protocol and SS7 network to provide the instant messaging in accordance with embodiments of the invention. A telemetry message such as a registration notification message or remote feature activation message may be utilized to indicate a cellular phone's 102 availability for instant messaging on a cellular network 104. When a cellular phone 102 moves to a different cellular network 104 or powers on or off the cellular phone 102, a telemetry message is delivered to the appropriate cellular network 102. Once a cellular network 104 receives a telemetry message, the message can be forwarded, reformatted, or generally acted upon in some manner.

In order to incorporate this telemetry messaging capability into an instant messaging product, one or more embodiments of the invention use a cellular phone 102 where the software is modified to have the phone initiate two messages (e.g., registration messages) upon powering up and two messages (e.g., de-registration messages) when powering down. The first message is a telemetry message (e.g., a registration message or remote feature activation message as described below) that appends the actual cellular mobile phone 102 number and a power on indicator. The second message is a standard registration/activation sequence with the cellular system 104. The power down sequence is similar except a power down indicator is added to the telemetry message.

One or more embodiments of the invention may transmit a registration notification telemetry message, available from Cellemetry, LLC. With such a message, when a roaming cellular phone 102 recognizes the fact that it is not in its home network 104, the roaming cellular phone 102 sends a registration notification message containing the phone's 102 MIN and ESN to register for the foreign cellular network 104 via a control channel. The foreign cellular system 104 recognizes the roamer number and routes the MIN and ESN to the roamer's home system 104 for validation. Depending on the cellular network's 104 preferences, such a registration notification message may be required as often as each call or as infrequently as once a day.

In another method available from Aeris.net, a remote feature activation telemetry message is transmitted. A remote feature activation message comprises data encoded in a field (e.g., a dialed digits field) of a message. With the remote feature activation message, a fictitious area code (e.g., 175) is programmed into a cellular phone/radio 102. When attempting to send data, the fictitious area code is preceded by the star character (*) (e.g., *175). This combination identifies to the cellular system that the customer desires to activate or deactivate a feature (e.g., call forwarding, call waiting, etc.). Since a fictitious area code is used (i.e., an area code other than the cellular network's 104 area code), the cellular network 104 interprets the cellular phone 102 as a roaming cellular phone 102 desiring to activate/deactivate a feature and routes the message (*XX175 followed by data) over the SS7 network 106 to the cellular phone's 102 home cellular network 104/location register. The home cellular network 104 is identified by the area code. Accordingly, an independently maintained system 104, at the specified area code, that provides added instant messaging functionality (as described below) is forwarded the telemetry message. By leveraging the fact that a request has to go to the serving home cellular network 104, data (e.g., meter reading, location, event, etc.) may be added into the telemetry message.

While messages are being transmitted to and from cellular phone 102, a unique message is sent from the foreign cellular network 104 to a telemetry partner's 108 home location register (HLR) (e.g., in the area code or home cellular network 104 specified by the telemetry message) that contains information that the cellular customer has powered on/off or is in a particular cellular network 104 and the cellular phone number of that customer. The message is forwarded to an instant messaging database 112, either maintained by a service provider, such as AirTouch, or with an instant messaging partner 110, such as America OnLine, MSN, or Yahoo. The instant messaging database 112 maintains the customer's profile (e.g., phone number, name, list of friends to include in the buddy/friend list, etc.).

The database 112 (through an instant messaging partner 110 if utilized) is provided to a server that interfaces with a network such as the Internet 114. The server also formats messages that may be delivered across the Internet 114 to update a PC 116 instant messaging application.

The server sends, at the same time, a browser alert to a service provider's server complex 118. The server complex 118 comprises various components such as the UP.Link Server 120 available from Phone.com. Further, the server complex 118 may comprise a WAP (wireless application protocol) gateway or SMTP (simple mail transfer protocol) gateway 122. Such a WAP protocol or gateway 122 may comprise a standard protocol that provides cellular phones 102, pagers, and other handheld devices with secure access to e-mail and text-based web pages.

The sever complex 118 may also include one or more short message service centers (SMSCs) 124. With an SMSC, cellular phone 102 users can use the cellular phone's 102 digital handsets to send and receive short messages such as text messages of up to 160 characters (in a global system for mobility (GSM) network) or more (in code division multiple access (CDMA) and time division multiple access (TDMA) networks). In accordance with one or more embodiments of the invention, the SMSCs 124 are utilized to send a browser alert to cellular phones 102 of cellular customers contained in a user's buddy/friend list. Using components 104-124, the invention is able to determine whether anyone on the user's buddy list is "active" or has their phone turned on. Accordingly, a cellular phone user 102 is notified when someone on the user's buddy list has turned on (or off) their cellular phone 102. Thereafter, the cellular phone user 102 can act upon the awareness of their friend's status to either send a text message utilizing data or a short message service (SMS), or call their friends who now have their phones on.

Figure 2:
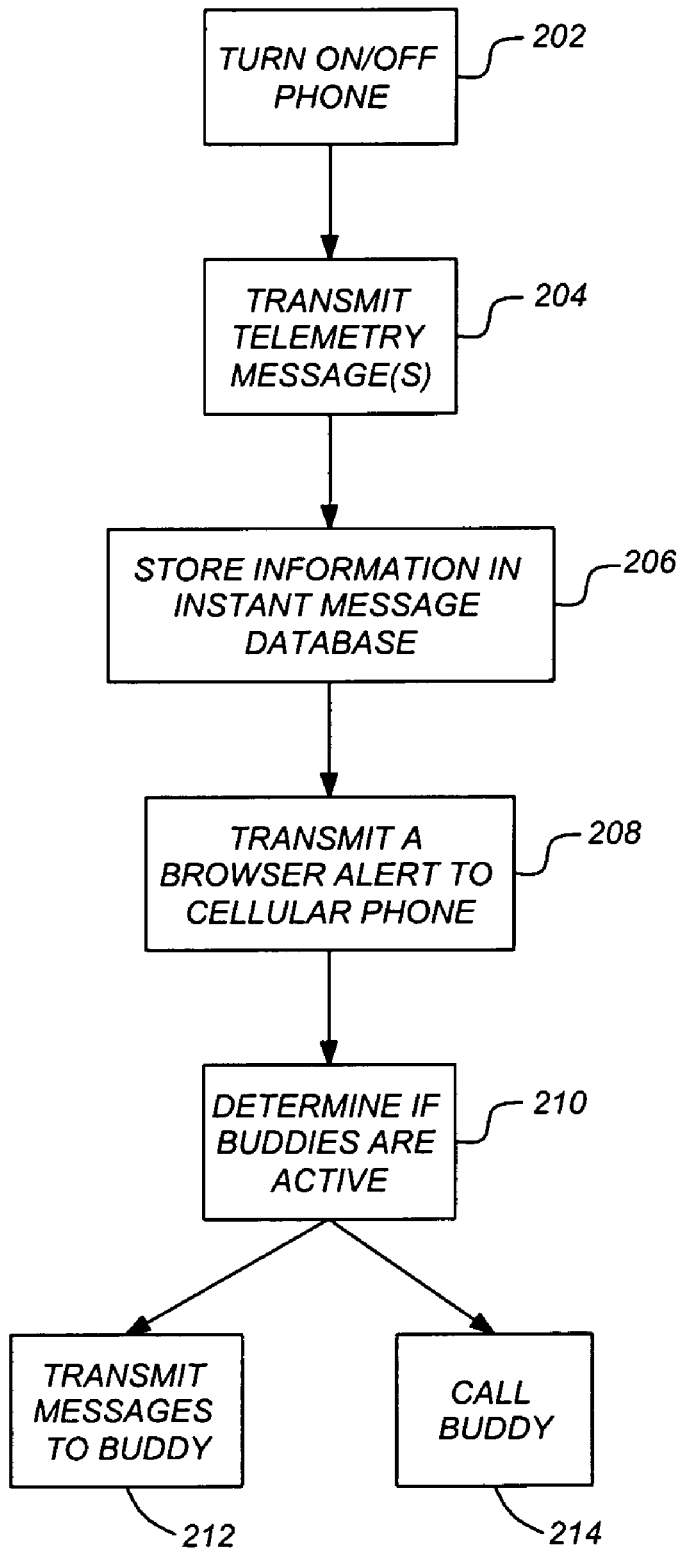
FIG. 2 is a flow chart illustrating an instant messaging system in accordance with one or more embodiments of the invention.

FIG. 2 is a flow chart illustrating an instant messaging system in accordance with one or more embodiments of the invention. At step 202, a user turns on or off a cellular phone 102 (referred to as the current user/cellular phone 102). At step 204, telemetry messages are transmitted from the cellular phone 102 as part of the power-up/power-down sequence. As described above, such a telemetry message identifies the cellular phone 102 and the power or availability status of the cellular phone 102. Thus, the telemetry messages indicate the availability of the cellular phone 102 on a cellular network 104.

At step 206, information is stored in an instant messaging database 112. Such information may include the cellular phone 102 number as well as whether the cellular phone 102 has been turned on or off. Since the instant messaging database 112 maintains information regarding cellular phones 102 and buddy lists, the database 112 may be utilized to determine the buddy lists that include the current cellular phone 102 as a buddy. At step 208, a browser alert is transmitted to the cellular phones 102 that have the current cellular phone 102 as a buddy. Additionally, if the current cellular phone 102 is being turned on/registered, the buddy list of the current cellular phone 102 may be examined. Thereafter, a browser alert is transmitted to the current cellular phone 102 that identifies those buddies that are available on the cellular network 104 (e.g., have their cellular phones 102 turned on).

At step 210, the current cellular phone 102 user determines if any buddies on the user's buddy list are available. Thereafter, the user may transmit messages using an SMS 124 at step 212 or may call the buddy at step 214.

CONCLUSION

This concludes the description of one or more embodiments of the invention. One or more embodiments of the invention provide the ability for cellular phone 102 users to transmit instant messages to other cellular phones 102 or to a PC 116. When a cellular phone 102 is powered on or off a sequence of messages are transmitted wherein other cellular phones 102 or computers 116 (that contain the current cellular phone 102 on a buddy list) are notified of the power status. Additionally, the cellular phone 102 is notified of the status (e.g., online or powered on) of buddies on its buddy list.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for enabling cellular instant messaging comprising:
    (a) receiving, in a cellular phone's home cellular network, a telemetry message from a foreign cellular network, wherein:
        (i) the telemetry message was originally transmitted from a first cellular phone to the foreign cellular network;
        (i) the telemetry message comprises an indication that the first cellular phone has been powered on; and
        (ii) the telemetry message comprises a remote feature activation message that is interpreted by the foreign cellular network as a roaming cellular phone desiring to activate/deactivate a feature;
    (b) in response to the home cellular network receiving the telemetry message, storing information regarding the first cellular phone in an instant messaging database, wherein the information comprises a buddy list; and
    (c) transmitting a browser alert to one or more relevant buddies identified in the buddy list.

2. The method of claim 1 wherein the telemetry message further comprises a registration notification message.

3. The method of claim 1 wherein the instant messaging database is maintained by an instant messaging partner.

4. The method of claim 1 wherein the information further comprises a customer's profile for the first cellular phone.

5. The method of claim 1 wherein the one or more relevant buddies comprise one or more cellular phones that have the first cellular phone on the buddy list.

6. The method of claim 1 wherein the one or more relevant buddies comprise buddies on the first cellular phone's buddy list.

7. The method of claim 1 wherein the one or more relevant buddies comprise computers connected to the Internet.

8. The method of claim 1 further comprising utilizing a short message service to deliver text messages using the first cellular phone.

9. The method of claim 1 wherein the remote feature activation message comprises data encoded in a dialed digits field of a message.

10. The method of claim 1 further comprising, receiving in the cellular phone's home cellular network, a second telemetry message from a foreign cellular network, wherein the second telemetry message comprises a standard registration message originally transmitted from the first cellular phone to the foreign cellular network.

11. A method for enabling cellular instant messaging comprising:
    (a) transmitting, from a first cellular phone to a foreign cellular network, a telemetry message, wherein:
        (i) the telemetry message comprises an indication that the first cellular phone has been powered on; and
        (ii) the telemetry message comprises a remote feature activation message wherein the remote feature activation message is interpreted by the foreign cellular network as a roaming cellular phone desiring to activate/deactivate a feature, and wherein the foreign cellular network forwards the telemetry message to the first cellular phone's home cellular network; and
    (b) receiving a browser alert, on the first cellular phone, indicating availability of buddies on a buddy list of the first cellular phone.

12. The method of claim 11 wherein the telemetry message further comprises a registration notification message.

13. The method of claim 11 wherein the remote feature activation message comprises data encoded in a dialed digits field of a message.

14. The method of claim 11 further comprising, transmitting, from the first cellular phone to the foreign cellular network, a second telemetry message, wherein the second telemetry message comprises a standard registration message that will be forwarded by the foreign cellular network to the home cellular network.

15. A system for enabling cellular instant messaging comprising:
    (a) an instant messaging database configured to maintain information regarding a first cellular phone, wherein the information comprises a buddy list;
    (b) a home cellular network;
    (c) a foreign cellular network; and (d) a server, on the home cellular network, configured to:
  (i) receive a telemetry message comprising a remote feature activation message from the foreign cellular network, wherein the telemetry message was originally transmitted from the first cellular phone, wherein the telemetry message indicates that the first cellular phone has been powered on, and wherein the remote feature activation message is interpreted by the foreign cellular network as a roaming cellular phone desiring to activate/deactivate a feature; and
  (ii) transmit, in response to home cellular network receiving the telemetry message, a browser alert to one or more relevant buddies identified in the buddy list.

16. The system of claim 15 wherein the telemetry message further comprises a registration notification message.

17. The system of claim 15 further comprising an instant messaging partner that is configured to maintain the instant messaging database.

18. The system of claim 15 wherein the information further comprises a customer's profile for the first cellular phone.

19. The system of claim 15 wherein the one or more relevant buddies comprise one or more cellular phones that have the first cellular phone on the buddy list.

20. The system of claim 15 wherein the one or more relevant buddies comprise buddies on the first cellular phone's buddy list.

21. The system of claim 15 wherein the one or more relevant buddies comprise computers connected to the Internet.

22. The system of claim 15 wherein the server is further configured to utilize a short message service to deliver text messages using the first cellular phone.

23. The system of claim 15 wherein the remote feature activation message comprises data encoded in a dialed digits field of a message.

24. The system of claim 15, wherein the server is further configured to receive, a second telemetry message from the foreign cellular network, wherein the second telemetry message comprises a standard registration message originally transmitted from the first cellular phone to the foreign cellular network.

25. A system for enabling cellular instant messaging comprising a first cellular phone configured to:
  (a) transmit, to a foreign cellular network, a telemetry message, wherein:
    (i) the telemetry message comprises an indication that the first cellular phone has been powered on; and
    (ii) the telemetry message comprises a remote feature activation message, and wherein the remote feature activation message is interpreted by the foreign cellular network as a roaming cellular phone desiring to activate/deactivate a feature, and wherein the foreign cellular network forwards the telemetry message to the first cellular phone's home cellular network;
  (b) receive a browser alert indicating availability of buddies on a buddy list of the first cellular phone.

26. The system of claim 25 wherein the telemetry message further comprises a registration notification message.

27. The system of claim 25 wherein the remote feature activation message comprises data encoded in a dialed digits field of a message.

28. The system of claim 25, wherein the first cellular phone is further configured to transmit a second telemetry message to the foreign cellular network, wherein the second telemetry message comprises a standard registration message that will be forwarded by the foreign cellular network to the home cellular network.

29. An article of manufacture comprising a program storage medium readable by a computer hardware device and embodying one or more instructions executable by the computer hardware device to perform a method for enabling cellular instant messaging, the method comprising:
  (a) receiving, in a home cellular network, a telemetry message, from a foreign cellular network, wherein:
    (i) the telemetry message was originally transmitted from a first cellular phone, the foreign cellular network;
    (ii) the telemetry message comprises an indication that the first cellular phone has been powered on; and
    (iii) the telemetry message comprises a remote feature activation message, and wherein the remote feature activation message is interpreted by the foreign cellular network as a roaming cellular phone desiring to activate/deactivate a feature;
  (b) in response to the home cellular network receiving the telemetry message, storing information regarding the first cellular phone in an instant messaging database, wherein the information comprises a buddy list; and
  (c) the home cellular network transmitting a browser alert to one or more relevant buddies identified in the buddy list.

30. The article of manufacture of claim 29 wherein the telemetry message further comprises a registration notification message.

31. The article of manufacture of claim 29 wherein the instant messaging database is maintained by an instant messaging partner.

32. The article of manufacture of claim 29 wherein the information further comprises a customer's profile for the first cellular phone.

33. The article of manufacture of claim 29 wherein the one or more relevant buddies comprise one or more cellular phones that have the first cellular phone on the buddy list.

34. The article of manufacture of claim 29 wherein the one or more relevant buddies comprise buddies on the first cellular phone's buddy list.

35. The article of manufacture of claim 29 wherein the one or more relevant buddies comprise computers connected to the Internet.

36. The article of manufacture of claim 29, the method further comprising utilizing a short message service to deliver text messages using the first cellular phone.

37. The article of manufacture of claim 29 wherein the remote feature activation message comprises data encoded in a dialed digits field of a message.

38. The article of manufacture of claim 29, wherein the method further comprises: receiving in the cellular phone's home cellular network, a second telemetry message from the foreign cellular network, wherein the second telemetry message comprises a standard registration message originally transmitted from the first cellular phone to the foreign cellular network.

39. An article of manufacture comprising a program storage medium readable by a computer hardware device and embodying one or more instructions executable by the computer hardware device to perform a method for enabling cellular instant messaging, the method comprising:
  (a) transmitting to a foreign cellular network, from a first cellular phone, a telemetry message, wherein:
    (i) the telemetry message comprises an indication that the first cellular phone has been powered on; and
    (ii) the telemetry messages comprises a remote feature activation message, wherein the remote feature activation message is interpreted by the cellular network as a roaming cellular phone desiring to activate/deactivate a feature, and wherein the foreign cellular network forwards the telemetry message to the first cellular phone's home cellular network;

(b) receiving a browser alert, on the first cellular phone, indicating availability of buddies on a buddy list of the first cellular phone.

40. The article of manufacture of claim 39 wherein the telemetry message further comprises a registration notification message.

41. The article of manufacture of claim 39 wherein the remote feature activation message comprises data encoded in a dialed digits field of a message.

42. The article of manufacture of claim 39, wherein the method further comprises transmitting, from the first cellular phone to the foreign cellular network, a second telemetry message, wherein the second telemetry message comprises a standard registration message that will be forwarded by the foreign cellular network to the home cellular network.

* * * * *